United States Patent [19]
Liebold et al.

[11] 3,907,701
[45] Sept. 23, 1975

[54] DEMULSIFYING CRUDE OIL EMULSIONS

[75] Inventors: Gert Liebold, Mannheim; Knut Oppenlaender, Ludwigshafen; Egon Buettner, Ludwigshafen; Rolf Fikentscher, Ludwigshafen; Rudolf Mohr, Lampertheim, all of Germany

[73] Assignee: Badische Anilin- & Soda-Fabrik Aktiengesellschaft, Ludwigshafen (Rhine), Germany

[22] Filed: June 5, 1973

[21] Appl. No.: 367,147

[30] Foreign Application Priority Data
June 7, 1972 Germany............................ 2227546

[52] U.S. Cl. ............... 252/344; 252/348; 252/358; 252/392
[51] Int. Cl.² ........................................ B01D 17/04
[58] Field of Search ..................................... 252/344

[56] References Cited
UNITED STATES PATENTS

| | | | |
|---|---|---|---|
| 2,552,530 | 5/1951 | DeGroote | 252/344 |
| 2,626,929 | 1/1953 | DeGroote | 252/342 |
| 2,792,372 | 5/1972 | Dickson | 252/344 |

Primary Examiner—Richard D. Lovering
Attorney, Agent, or Firm—Johnston, Keil, Thompson & Shurtleff

[57] ABSTRACT

Rapid dehydration of crude oils containing salt water by addition of minor amounts of polyalkylene polyamines having at least fifty recurring ethylene imine or propylene imine units, the said polyalkylene polyamine being completely alkoxylated at the nitrogen atom with from 10 to 300 moles of ethylene oxide and/or propylene oxide. Using these compounds it is possible to effect dehydration, in an economical manner, of crude oils containing up to relatively large percentages of high molecular weight hydrocarbons.

7 Claims, No Drawings

DEMULSIFYING CRUDE OIL EMULSIONS

It is well known that crude oil emulsions of the oil-in-water type may be demulsified using block copolymers of ethylene oxide and/or 1,2-propylene oxide, as taught for example by U.S. Pat. No. 2,964,478. Such emulsions consist of water in which oil is emulsified in the form of fine droplets. The compounds given in said patent are not suitable for emulsions of the opposite type, namely water-in-oil emulsions, in which water is emulsified in the form of fine droplets in the continuous oil phase. Demulsification of the latter types, i.e., the dehydration of freshly tapped crude oils, is a very important problem for the mineral oil industry and a large number of solutions thereof have been attempted and proposed in a great number of patent specifications and articles.

It has even been proposed to use such block copolymers for demulsifying water-in-oil emulsions provided said block copolymers have specific structural compositions. German Published Application No. 1,545,250, for example, discloses a dehydration process in which various alkylene oxide polymers and derivatives thereof having hydrophilic end groups are added to the water-in-oil emulsions, but it has since been found that these compounds achieve their full activity at an inadequate rate and frequently only at elevated temperatures. It is now known that these compounds, after use, leave too much residual water, salt or emulsion, and above all, they are adequately effective only on a few specific types of oil.

Water-in-oil emulsions are usually heated, at a comparatively high energy consumption, to temperatures of 40° and often above 80°C, depending on viscosity, for treatment by a chemical or combined electrical and chemical process to reduce their contents of water, salt and, possibly, residual emulsion to the desired low level.

It is always desirable for it to be possible to demulsify water-in-oil emulsions at the temperatures at which they are tapped, i.e., between 10° and 40°C, by the addition of suitable demulsifiers and without additional heating.

The hope of finding a universal demulsifier for the entire palette of crude oils found in the world is more or less utopian on account of the various compositions of crude oils.

However, it is desirable to develop demulsifiers suitable for large numbers of related types of oil, as otherwise an unduly large number of products would be required in this field.

Previously used demulsifiers, which have usually been based on alkoxylated compounds and their simple derivatives and have mostly been low molecular weight alkoxylated products, were mainly effective on crude oils not containing unduly high proportions of high molecular weight hydrocarbons. Oils of this kind containing the last-mentioned substances differ from oils containing low molecular weight portions as regards their solidifying point and viscosity and are thus much more difficult to demulsify.

In such cases it is at least necessary to operate at elevated temperatures, which means that the consumption of electrical energy in treaters is high when previous demulsifiers are used, and it is above all necessary to use the maximum possible amount of demulsifier in order to achieve fairly satisfactory dehydration, this involving a considerable increase in expense.

It is a well known fact that there are certain limits to the amount of demulsifier which can be used in an emulsion. If these limits are exceeded, i.e., if too much emulsifier is added, the demulsifier may then act as an emulsifying agent and thus reverse its activity.

It is an object of the present invention to provide a process for dehydrating crude oil and particularly crude oil containing a high percentage of high molecular weight hydrocarbons. It is a special object of the invention to provide means of using a minimum amount of demulsifier and, above all, of carrying out demulsification at acceptably low temperatures. It is a further object, in view of the law concerning environmental pollution, to ensure that the demulsifiers do not promote corrosion in, say, pipelines.

The above objects are achieved in a process for rapid dehydration of crude oils by the addition of demulsifying substances based on derivatives of polyalkylene oxides. The process is characterized in that there is added to the crude oil at least one polyalkylene polyamine having at least fifty recurring alkylene imine units in the molecule and totally alkoxylated at each nitrogen atom with from 10 to 300 moles of alkylene oxide.

Methods of producing the compounds to be added according to the invention are well known. The compounds may be obtained in one or several stages. If synthesis is carried out in several stages and preferably in two stages, the compounds obtained are generally within defined limits as regards their molecular weight distribution. When produced in one stage, the molecular weight distribution of the products shows greater scatter, but this has no great influence on the application properties of the compounds.

If a two-stage process is employed, for example, the first stage will involve the action of alkylene oxide on the polyalkylene polyamine in the presence of from 1 to 50% by weight of water in a stirred pressure vessel at from about 80° to 100°C, the amount of alkylene oxide absorbed being such as to produce the corresponding aminoalkanol with saturation of all hydrogenbinding valencies of the nitrogen atoms.

In the second stage, there is added, after removal of the water, optionally under reduced pressure, from about 0.5 to 2% by weight (based on anhydrous aminoalkanol in the first stage) of an alkaline catalyst such as sodium methylate, potassium hydroxide, sodium hydroxide and basic ion exchangers, whereupon further alkoxylation with the required amount of alkylene oxide is carried out at from about 125° to 135°C.

In a single-stage process, the reaction may be carried out, for example, by introducing the total amount of alkylene oxide under pressure and in the presence of alkaline catalyst of the above kind with or without water and allowing the reaction to proceed to completion at temperatures of between 125° and 135°C. As mentioned above, this may produce a larger proportion of byproducts such as pure polyalkylene glycol ethers, but this has no great influence on the desired properties of the products.

The starting products used for the synthesis of the compounds added according to the present invention are polyalkylene polyamines such as may be obtained in known manner from ethylene imine and/or propylene amine. We prefer to start from ethylene imine. The polyalkylene polyamines have at least fifty recurring alkylene imine units in the molecule. For the purposes of the invention, polyethylene imines having from 50 to 3,000 recurring ethylene imine units are particularly valuable.

Suitable alkylene oxides for the alkoxylation are any of the usual alkylene oxides such as ethylene oxide, 1,2-propylene oxide, 1,2-butylene oxide, 2,3-butylene oxide, styrene oxide and cyclohexene oxide, propylene oxide and ethylene oxide being particularly suitable.

The various alkylene oxides may be reacted with the polyalkylene polyamines either singly or together to give a block copolymerization or copolymerization type of reaction. If a two-stage process is employed, the alkylene oxide may also be used singly or in the form of a mixture in the first stage, in which latter case a mixture of aminoalkanols as regards the alkanol groupings is produced. In the second stage the process is carried out as described above, as also in the case of a single-stage process.

We prefer to use propylene oxide alone or propylene oxide and ethylene oxide caused to react so as to give a block copolymerization type of reaction. In the first stage, 1,2-propylene oxide is added to form the corresponding propanolamine, followed by further propylene oxide and, finally, ethylene oxide, satisfactory results being obtained with a ratio of propylene oxide to ethylene oxide of up to 1:15. Alternatively, the alkylene oxides may be added in reverse order, i.e., first ethylene oxide and then propylene oxide, the ratios of ethylene oxide to propylene oxide being conveniently chosen at from 20:1 to 1:20. Both variations may be realized in a single-stage or two-stage process.

If a copolymerization type of reaction is required, use is made of mixtures of propylene oxide and ethylene oxide at a ratio of up to 1:15 ("mixed gas").

The above possibilities are basically applicable to the other alkylene oxides mentioned above, in which case substantially any ratio may be selected, where the alkylene oxides are not used alone, but if ethylene oxide is used, the above ratios should be employed with corrections for the various molecular weights.

In all types of alkoxylation, it is important, however, for from 10 to 300 and preferably from 60 and 150 alkylene oxide units to be present in the final molecule per alkoxylatable nitrogen valence.

The production costs are low and the synthesis is not dangerous to the operators on account of the non-poisonous character of the substances produced.

The compounds obtained have excellent demulsifying properties and also good anticorrosive activity, which makes them even cheaper to use, since some or all of the corrosion inhibitors otherwise necessary may be omitted.

The compounds to be added in accordance with the present invention invention and referred to below as demulsifiers are characterized by their OH numbers, hydrogenation iodine numbers and, in some cases, by their turbidity points.

The demulsifiers may be used in substance or in solution as cold or hot demulsifiers for water-in-oil emulsions and particularly for those in which the oil component has a particularly high concentration of high molecular weight hydrocarbons.

The present demulsifiers are distinguished by their unexpectedly rapid action when used on said emulsions, which are very difficult to treat. The demulsifiers are preferably used in the form of solutions on account of their ease of metering in this form. Suitable solvents are water and organic solvents which boil in the range 50° to 200°C, suitable representatives being for example benzene, toluene, the xylenes, carbon tetrachloride, tetrahydrofuran, dioxane, lower alcohols and light petroleum fractions boiling in said range.

When, preferably, solutions are used, these are conveniently adjusted to a solids content (content of demulsifier) of from 0.5 to 50% by weight. Demulsifying is preferably effected by adding the solutions to the crude oils at the wells. Demulsifying then occurs at the temperature of the freshly tapped water-in-oil emulsion and at such a rate that the emulsion can break during its passage to the oil treating station, where it is readily separated into dry oil and salt water (such water-in-oil emulsions are always in the form of salt-water-in-oil emulsions) in a separator which may or may not be heated and, if necessary, with the aid of an electric field, if cold demulsification is sluggish. In difficult cases, a small proportion of salt water remains in the crude oil in the separators. In the then necessary further treatment in chemical or combined electrical and chemical treaters at elevated temperatures, there is the advantage that the major portion of the water has in most cases already been separated and thus no longer requires heating. Furthermore, using this method, the oil is fully demulsified in from about 60 to 120 minutes on account of the rapid demulsifying of the said demulsifiers. The fact that in many cases it is no longer necessary to heat up the water in its original amount is in itself of great consequence, since water has approximately twice as much specific heat ($1$ cal $\times$ g$^{-1}$ °C$^{-1}$) as petroleum ($0.5$ cal $\times$ g$^{-1}$ °C$^{-1}$). In addition, the demulsifiers of the invention have the great advantage that the aforementioned post-treatment in treaters may usually be omitted. The temperatures at which certain crude oils containing higher hydrocarbon chains are demulsified are from 40° to 80°C. In general, temperatures of between 50° and 80°C are maintained and these give optimum results.

The demulsifiers are added to the crude oil emulsions conveniently in amounts of from 1 to 10,000 ppm and preferably from 10 to 1,000 ppm, based on the weight of the emulsion to be separated, at temperatures of from 50° to 80°C.

The rapid-action demulsifiers to be used in the present invention may be applied to water-in-oil emulsions containing from about 0.1 to 90% by weight of salt water. Suitable oils for rapid dehydration in this manner are all oils of said kind from various sources, but preferably oils from North Germany, North West Germany and U.S.S.R., since most of the typical representatives of the said types of oil are from these areas.

The separation of the water-in-oil emulsions takes place extremely rapidly and approximately quantitatively without the application of additional heat within the above temperature limits. If, in unfavorable cases, treaters have to be used, demulsifying occurs within a few minutes and never in more than 1 to 2 hours.

The following Examples illustrate the use of the compounds to be added in accordance with the present invention. For purposes of comparison, simple block copolymers of ethylene oxide and propylene oxide are used, these having a good demulsifying action on oils containing low percentages of high molecular weight hydrocarbons but a less effective action in the present case. The oils tested were oils from North Germany, North West Germany and U.S.S.R. from various sources characterized by their water contents.

| Product | Amount [ppm] | 10 | 20 | 30 | 45 | 60 | 120 | 16hr | Residual water [%] | Residual emulsion [%] |
|---|---|---|---|---|---|---|---|---|---|---|
| North German Crude Oil, 22% H$_2$O, stirred test at 35°C | | | | | | | | | | |
| polyethylene/polypropylene glycol ether (polyether) | 200 | 0 | 0 | 0 | 0 | 0 | 1 | 13 | not measured | |
| polyethylene imine 2000/70 PrO/20 EO | 200 | 2 | 4 | 4 | 7 | 11 | 20 | 22 | 0.1 | 0.1 |
| polyethylene imine 1000/38 EO/72 PrO | 200 | 0 | 0 | 0 | 1 | 1 | 9 | 21 | 1.0 | 0.3 |
| Crude oil from U.S.S.R., 42% H$_2$O, stirred test at 80°C | | | | | | | | | | |
| polyether | 50 | 2 | 3 | 4 | 6 | 7 | 10 | 25 | not measured | |
| polyethylene imine 2000/35 EO/72 PrO | 50 | 7 | 11 | 15 | 22 | 26 | 31 | 40 | 1.2 | 0.0 |
| polyethylene imine 1000/36 EO/71 PrO | 50 | 7 | 9 | 11 | 17 | 24 | 36 | 41 | 0.5 | 0.0 |
| polyethylene imine 38 EO/72 PrO | 50 | 2 | 6 | 10 | 20 | 29 | 39 | 42 | 0.2 | 0.0 |
| North West German Crude Oil, 42% H$_2$O, stirred test at 60°C | | | | | | | | | | |
| polyether | 10 | tr | tr | 1 | 1 | 2 | 4 | 8 | not measured | |
| polyethylene imine 2000/94 PrO | 10 | 5 | 10 | 16 | 30 | 35 | 35 | 39 | 2.2 | 0.2 |
| polyethylene imine 500/20 EO/80 PrO | 10 | 2 | 8 | 19 | 31 | 36 | 38 | 42 | 0.2 | 0.0 |
| polyethylene imine 1000/38 EO/72 PrO | 10 | 1 | 6 | 15 | 30 | 39 | 40 | 42 | 0.2 | 0.0 |
| North West German Crude Oil, 45% H$_2$O, stirred test at 60°C | | | | | | | | | | |
| polyether | 25 | tr | tr | tr | tr | tr | tr | 3 | not measured | |
| polyethylene imine 2000/94 PrO | 25 | 0 | tr | 6 | 20 | 27 | 35 | 43 | 1.8 | 0.5 |
| polyethylene imine 1000/81 PrO/21 EO | 25 | 0 | 10 | 38 | 42 | 43 | 43 | 45 | 0.1 | 0.0 |
| polyethylene imine 1000/38 EO/72 PrO | 25 | 1 | 7 | 18 | 39 | 45 | 45 | 45 | 0.1 | 0.0 |
| North West German Crude Oil, 32% H$_2$O, stirred test at 35°C | | | | | | | | | | |
| polyether | 100 | 0 | 1 | 3 | 14 | 18 | 20 | 22 | 8.0 | 4.2 |
| polyethylene imine 2000/95.5 PrO/24 EO | 100 | 0 | 2 | 7 | 20 | 26 | 29 | 30 | 1.0 | 0.5 |
| polyethylene imine 50/80 PrO/20 EO | 100 | 1 | 6 | 21 | 27 | 28 | 30 | 31 | 0.5 | 0.0 |
| polyethylene imine 1000/81 PrO/21 EO | 100 | 0 | 1 | 7 | 22 | 27 | 30 | 31 | 0.3 | 0.0 |
| North West German Crude Oil, 35% H$_2$O, stirred test at 60°C | | | | | | | | | | |
| polyether | 25 | 3 | 5 | 10 | 15 | 20 | 25 | 26 | not measured | |
| polyethylene imine 100/80 PrO/20 EO | 25 | 0 | 5 | 11 | 12 | 13 | 19 | 36 | 0.1 | 0.0 |
| polyethylene imine 100/36 EO/71 PrO | 25 | 3 | 10 | 19 | 25 | 29 | 32 | 35 | 0.2 | 0.0 |
| polyethylene imine 1000/38 EO/72 PrO | 25 | 3 | 7 | 13 | 18 | 22 | 27 | 33 | 0.8 | 0.2 |

N.B.

"polyethylene imine 2000/70 PrO/20 EO" signifies a polyethylene imine having on average 2,000 recurring ethylene imine units and alkoxylated with 70 moles of 1,2-propylene oxide and 20 moles of ethylene oxide per NH valence (polyethylene imine obtained from ethylene imine using ammonium chloride or ethylene diamine hydrochloride as catalyst).
The compounds used in the other Examples are similarly designated.

We claim:

1. In a process for rapid dehydration of a crude oil in the form of a saltwater-in-oil emulsion by the addition of a demulsifying compound based on derivatives of polyalkylene oxides, the improvement which comprises; adding to said crude oil a minor amount of a solution containing in an aqueous or organic phase, as the essential demulsifying compound, a polyalkylene polyamine having at least 50 and up to 3,000 recurring ethylene imine or propylene imine units, which polyalkylene polyamine is totally alkoxylated at the nitrogen atoms with from 10 to 300 moles of ethylene oxide and-/or propylene oxide; and then separating the salt-containing aqueous phase from the crude oil.

2. A process as claimed in claim 1, wherein the alkoxylated polyalkylene imine
   a. is reacted only with propylene oxide,
   b. is reacted first with propylene oxide and then with ethylene oxide, or
   c. is reacted first with ethylene oxide and then with propylene oxide.

3. A process as claimed in claim 2, wherein the ratio of propylene oxide to ethylene oxide in case (b) is up to 1:15 and the ratio of ethylene oxide to propylene oxide in case (c) is from 20:1 to 1:20.

4. A process as claimed in claim 1, wherein the alkoxylated polyalkylene imine is a compound produced by mixed alkoxylation with ethylene oxide and propylene oxide.

5. A process as claimed in claim 1, wherein the alkoxylation products are added to the crude oil in quantities ranging from 1 to 10,000 ppm and preferably from 10 to 1,000 ppm.

6. A process as claimed in claim 1, wherein the alkoxylation products are used in the form of 0.5 to 50% w/w solutions in water or organic solvents.

7. A process as claimed in claim 1, wherein there are about 50 to 2,000 recurring imine units in the polyalkylene polyamine.

* * * * *

UNITED STATES PATENT AND TRADEMARK OFFICE
CERTIFICATE OF CORRECTION

PATENT NO. : 3,907,701
DATED : September 23, 1975
INVENTOR(S) : LIEBOLD et al

It is certified that error appears in the above-identified patent and that said Letters Patent are hereby corrected as shown below:

In Column 5, Lines 53 & 54, delete " ... comprises; adding to said ... " and substitute -- ... comprises: adding to said ... --

Signed and Sealed this

Fifth Day of October 1976

[SEAL]

Attest:

RUTH C. MASON
Attesting Officer

C. MARSHALL DANN
Commissioner of Patents and Trademarks